United States Patent [19]

Callaghan

[11] Patent Number: 4,582,429

[45] Date of Patent: Apr. 15, 1986

[54] READOUT FOR A RING LASER

[75] Inventor: Stephen P. Callaghan, Minneapolis, Minn.

[73] Assignee: Honeywell, Minneapolis, Minn.

[21] Appl. No.: 482,665

[22] Filed: Apr. 6, 1983

[51] Int. Cl.[4] ............ G01C 19/64

[52] U.S. Cl. ............ 356/350

[58] Field of Search ............ 356/350; 372/94

[56] References Cited

U.S. PATENT DOCUMENTS

| | | | |
|---|---|---|---|
| 3,320,850 | 5/1967 | Oliver | 356/350 X |
| 3,382,760 | 5/1968 | Macek | 356/350 |
| 3,484,169 | 12/1969 | Skalski et al. | 356/350 |
| 4,141,651 | 2/1979 | Smith et al. | 356/350 |
| 4,473,297 | 9/1984 | Simpson et al. | 356/350 |

*Primary Examiner*—Vincent P. McGraw
*Attorney, Agent, or Firm*—Robert A. Pajak

[57] ABSTRACT

Disclosed is a readout apparatus for obtaining single beam and double beam signals for a ring laser angular rate sensor.

22 Claims, 1 Drawing Figure

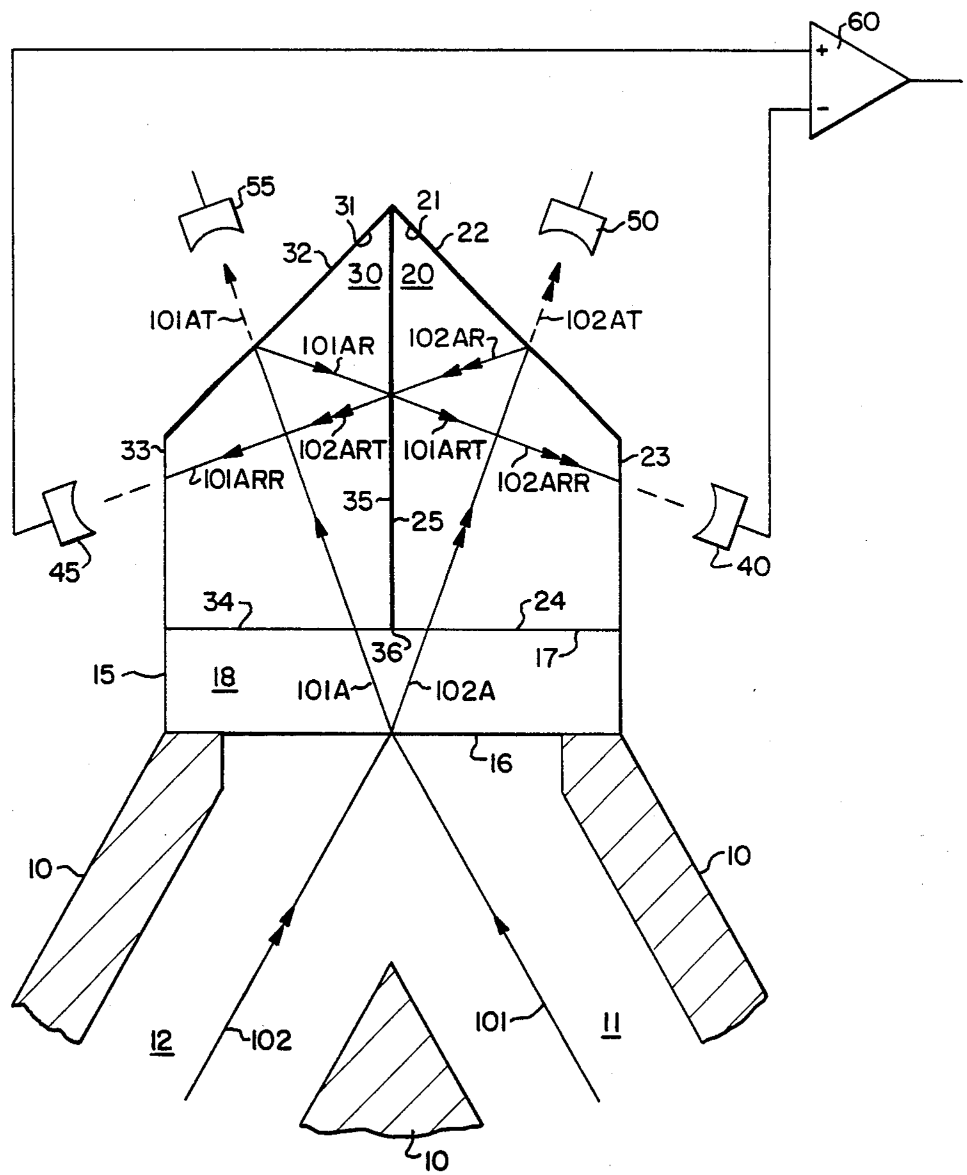
60
+
-
55
31
21
22
50
32
30
20
101AT
102AT
101AR
102AR
33
102ART
101ART
23
101ARR
102ARR
35
25
45
40
34
24
36
15
18
17
101A
102A
16
10
10
12
102
101
11
10

READOUT FOR A RING LASER

The United States Government has rights in this invention pursuant to Contract No. F04701-76-C-0135, awarded by the Department of Air Force.

BACKGROUND OF THE INVENTION

This invention relates to ring laser angular rate sensors, and more particularly to a ring laser readout mechanism.

Ring laser angular rate sensors are well known in the art of inertial navigational systems. Some examples of ring laser angular rate sensors are shown and described in U.S. Pat. Nos. 3,373,650; 3,390,606, 3,467,472 and 4,152,071, all of which are assigned to the assignee of the present application. Sensors as those described in the aforementioned patents utilize what is sometimes referred to as a double beam signal for providing sensor information. The double beam signal is essentially a portion of each of the counterpropagating laser beams emerging from the laser angular rate sensor. The emerging double beam signal provides an interference pattern useful for rate information. If the portion of each beam of the double beam signal which emerges is colinear, a spot interference pattern is created. On the other hand, if the portion of each beam which emerges is at a slight angle, an interference pattern of lines is created. When the interference pattern is projected on a detector, such as a photodetector, angular information may be obtained by counting the interference pattern maxima and rate information may be obtained by measuring the time difference between maxima.

As disclosed in U.S. Pat. No. 4,152,071, rate information is also available in a single beam signal since the intensity of a single beam is modulated at the beat frequency between the waves or beams which is directly related to the angle of rotation of the sensor. The latter type of beat information, although useful for obtaining sensor rate information, is particularly useful in providing a signal indicative of the lock-in rate of the sensor and thus is useful in negative feedback control systems for operating the laser angular rate sensor at a minimum lock-in rate.

It is an object of the present invention to provide a readout mechanism for a ring laser angular rate sensor having both double beam output signals and single beam signals.

BRIEF DESCRIPTION OF THE INVENTION

In the present invention two mechanically thermally stable blocks provide a pair of light transmitting blocks or prisms which are responsive to countertraveling beams of a ring laser angular rate sensor. The prisms are appropriately optically coated so as to provide three beam splitters. The beam splitters are arranged and coupled to the sensor so as to provide separate single beam output signals for each of the counterpropagating sensor laser beams, and also provide first and second sensor double beam signals in which the first and second double beam signals have a complementary phase so that combining the pair of double beam signals provides an output signal having good signal quality.

BRIEF DESCRIPTION OF THE DRAWINGS

FIG. 1 is a schematic block diagram of an embodiment of the invention.

DETAILED DESCRIPTION OF THE INVENTION

Shown in FIG. 1 is a portion of a thermally and mechanically stable block 10 similar to that shown and described in U.S. Pat. No. 3,390,606. Block 10 provides a laser gain medium in combination with a plurality of wave reflecting means positioned to form a closed optical path so as to provide a pair of counterpropagating laser beams traveling about the closed-loop path. As illustrated in FIG. 1, there exists a laser beam 101 traveling in one direction and indicated by a single arrow. Traveling in the opposite direction is a laser beam 102 which is indicated by two arrows. Positioned at the intersection of tunnels 11 and 12 of block 10 is a partially transmissive wave reflecting means 15 having a wave reflecting surface 16. If block 10 and the associated plurality of wave reflecting means are appropriately arranged, beam 101 and beam 102 will impinge upon reflecting surface 16 at approximately the same point and reflect therefrom into the opposite and adjacent tunnels. Wave reflecting means 15, well known in the art, usually consists of a substrate 18 having a partially transmissive coating on the surface 16 thereof. The configuration as just described as well known in the art of ring laser angular rate sensors.

Further shown in FIG. 1 is the readout apparatus of the present invention including block 20 and block 30 which are used to direct beams of light in accordance with its configuration. Blocks 20 and 30 provide a medium for directing optical beams or waves in a manner defined by their prismlike structure. Block 20 includes a first surface 21 having a partially transmissive optical coating 22, a second surface 23, a third surface 24, and a fourth surface 25 for directing light beams in a manner as will subsequently be described. Block 30 includes a first surface 31 having a partially transmissive optical coating 32, a second surface 33, a third surface 34, and a fourth surface 35 having a partially transmissive optical coating 36 for also directing light beams. Optical coatings 22, 32, and 36 at surfaces 21, 31, and 35 respectively function as beam splitters. As is well known, a selected dielectric coating will determine the ratio of reflection to transmission of the optical beams impinging on the surfaces having the coating. Therefore, surface 21 and coating therewith is herein considered to be a first beam splitter, surface 36 and coating therewith is herein considered to be a second beam splitter, and surface 31 and coating therewith is considered to be a third beam splitter. Each beam splitter is capable of reflecting a portion of impinging light beams thereon, and further capable of transmitting a portion of the impinging light beams.

Blocks 20 and 30 are optically joined together providing common interface at surfaces 25 and 35 by, for example, an optical cement. Further, blocks 20 and 30 are joined in such a manner so that surfaces 24 and 34 are coplanar and optically cemented to surface 17 of substrate 18. The angles between respective surfaces of each of the blocks are such so as to provide an optical arrangement as will now be described.

Laser beam 101 impinges upon wave reflecting surface 16 and a portion of beam 101, namely 101A, is refracted by substrate 18 and transmitted through substrate 18 and block 30 thereby impinging upon the third beam splitter (surface 31) which splits beam 101A into a transmitted portion 101AT and a reflected portion 101AR. Beam 101AT is directed toward a detector means 55, and beam 101AR is directed to impinge upon the second beam splitter (surface 35) which splits beam 101AR into a transmitted portion 101ART and a reflected portion 101ARR. In turn, beam 101ARR travels through block 30 and emerges from surface 33 toward detector means 45 at a first spatial location.

In a similar manner, laser beam 102 impinges upon wave reflecting surface 16, and a portion of beam 102, namely 102A, is refracted by substrate 18 and transmitted through substrate 18 and block 20 thereby impinging upon the first beam splitter (surface 21) which splits beam 102A into a transmitted portion 102AT and a reflected portion 102AR. Beam 102AT is directed toward a detector means 45, and beam 102AR is directed to impinge upon the second beam splitter which splits beam 102AR into a transmitted portion 102ART and a reflected portion 102ARR. In turn, beam 102ARR travels through block 20 and emerges from surface 23 toward detector means 40 at a second spatial location.

Detectors 40 and 45 may be photodetectors coupled directly to blocks 20 and 30 respectively. On the other hand, they may be somewhat removed as shown in FIG. 1. Detectors 40 and 45 are spatially located based on the configuration of blocks 20 and 30 since they must be responsive to impinging beams emerging from the second beam splitter's first and second surfaces. This is so since the position of surfaces 21 and 31 with respect to the common interface of surfaces 25 and 35 determines, at least in part, the spatial location where the emerging beams from the second beam splitter are directed, therefore establishing the desired location or position of detectors 40 and 45. Similarly, detectors 50 and 55 must also be spatially located to be responsive to the appropriate beam, and may also be either directly coupled to surfaces 21 and 31 or be somewhat removed.

The construction of blocks 20 and 30 and their respective surfaces must be such that the angle of surfaces 21 and 31 with respect to surface 16 of substrate 18 causes the reflected beams 101AR and 102AR to impinge upon essentially the same point of the second beam splitter from opposite sides thereof. The position of surfaces 21 and 33 is not critical, but it is desirable that all beams traverse substantially equally path lengths. Thus, a symmetrical construction of blocks 20 and 30 is desirable.

On the other hand, the relative angle between surface 35 and both surfaces 21 and 31 is critical. If the first, second, and third beam splitters, and the angles therebetween, are appropriately arranged, beams 101ARR and 102ART coexist and are coaxial thereby providing a double beam signal having an intensity related to the combined intensity of beams 101ARR and 102ART which is a function of the phase relationship between beams 101 and 102. Similarly, if the first, second, and third beam splitters are appropriately arranged, beams 101ART and 102ARR coexist and are coaxial and provide a double beam signal having an intensity related to the combined intensity of beams 101ART and 102ARR which is also a function of the phase relationship between beams 101 and 102. Therefore, detectors 40 and 45 are each separately responsive to a double beam signal which has an intensity which varies as a function of the phase difference between beams 101 and 102. In the above circumstances, i.e. coaxial beams, detectors 40 and 45 have output signals which are directly related to the intensity of the "spot" interference pattern created by the double beam signal. The detector output signals therefore provide sensor rotation information in a well known manner.

As so far described, a first double beam signal consisting of the combined beams 101ARR and 102ART emerges from a first surface of the second beam splitter, and a second double beam signal consisting of the combined means 101ART and 102ARR emerges from the second surface of the second beam splitter. If the second beam splitter is constructed by way of a low absorption or low loss optical coating such as a dielectric material, the reflected and transmitted beams of an impinging beam will be substantially complementary or 180° out of phase with each other. Accordingly, the first and second double beam signals will also be complementary or 180° out of phase with each other. As illustrated in FIG. 1, the output of detector 45, namely a photodetector, is presented to a positive input of a difference amplifier 60; and the output of detector means 40, namely another photodetector, is presented to the negative input of difference amplifier 60. Therefore, since the first and second double beam signals emerging from surfaces 23 and 33 are comlementary, the output of difference amplifier 60 will be a signal which has effectively double the signal level of either one of the double beam signals by itself.

The system as so far described is particularly useful for laser angular rate sensors which are provided with a constant input bias, that is, a sensor which is mechanically rotated in one direction. In these circumstances, there is no need for a direction indicator since the sensor in effect is effectively rotating in the same direction all the time and has an amplitude which changes more or less with the inertial input rate. On the other hand, the system illustrated in FIG. 1 needs to be modified to some extent so as to be operable for sensor systems in which the sensor is dithered, back and forth in a rotational mode. It should be noted that both the constant rate bias and the dithering bias have optical counterparts without requiring mechanical motion, and are intended to be within the scope of the present invention.

In the situation where a back and forth rotational dither is used, it is important to identify the direction of rotation since the sensor is rotated back and forth. Rotation direction information may be obtained by one of several techniques. In a first technique the position of surfaces 21, 31, or the common interface surface of surfaces 25 and 35 may be altered so as to produce an angle between the reflective and transmitted beams emerging from the second beam splitter. Thus beams 101ARR and 102ART, and beams 101ART and 102ARR will no longer be coaxial, and create a "spot" interference pattern. On the other hand, the angle between the beams will cause an interference pattern which is a spread out linear fringe interference pattern whereby a pair of photodetectors appropriately separated and responsive to the interference pattern can be used to determine direction in a well known manner.

In a second technique, the second beam splitter formed by surface 35 is produced to have a somewhat high optical beam (wave) absorption or loss. If the optical absorption is of a sufficient amount, it is possible to impose a phase shift between the first and second double beam signals emerging from each side of the second beam splitter so that the beams will no longer be complementary (180° phase shift). It is desirable to impose a 90° phase difference between the first and second double beam signals. In these circumstances, the output of detectors 40 and 45 can be phase compared to determine direction. It is analogous to two detectors spatially separated for monitoring a linear interference pattern like the first technique. Optical absorption in the second beam splitter may be accomplished by using one of a variety of high absorption metallic coatings instead of a low loss dielectric coating. It should be noted that in the second technique the output of detectors 40 and 45 are not directly different in difference amplifier 60 since their output signals are in phase quadrature.

Thirdly, directional information may be obtained by use of the output signals of detectors 50 and 55, which may be photodetectors responsive to the intensity of the single beam signals. Direction can be obtained by monitoring the frequency variation of each of the single beam signals. This is so since the beam modulation is related to phase difference between the waves as taught in U.S. Pat. No. 4,152,071.

In FIG. 1, blocks 10, 20, and 30 as well as substrate 18 have been shown joined to each other. However, blocks 20 and 30 may be removed from substrate 18 and is within the scope of the present invention. Further, blocks 10, 20, and 30 as well as substrate 18 may be made from a variety of materials including, but not limited to quartz, CerVit and Zerodeur. It has been shown that the use of three beam splitters appropriately arranged and responsive to the countertraveling beams of a ring laser angular rate sensor can provide a portion of each of the single beam signals and a pair of double beam signals 180° out of phase. It should be understood, therefore, that various changes and modifications of that shown in FIG. 1 and described herein will be apparent to those skilled in the art. Such changes and modifications can be made without departing from the spirit and scope of the present invention and without diminishing its advantages.

The embodiments of the invention in which an exclusive property or right is claimed are defined as follows:

1. A readout apparatus for a ring laser wherein a laser gain medium in combination with a plurality of wave reflecting means which are positioned to form an optical closed-loop path provides at least two counter-propagating waves traveling about said closed-loop path, the readout apparatus comprising:

one of said plurality of wave reflecting means being partially transmissive and capable of transmitting a first wave which is a portion of one of said counter-propagating waves impinging thereon, and a second wave which is a portion of the other one of said counter-propagating waves also impinging thereon;

a first mechanically and thermally stable block for providing a medium for transmission of optical waves, said first block having, a first surface in the path of said first wave for producing a first in-block wave within said block, said first in-block wave being at least a portion of said first wave impinging on said first surface;

a second surface optically coated to provide a first beam splitter, said first beam splitter being in the path of said first in-block wave such that the angle of incidence thereon is less than 45 degrees, said first beam splitter splitting said first in-block wave into a third wave and a fourth wave, said third and fourth waves being a transmitted portion and a reflected portion, respectively, of said first in-block wave, a third surface optically coated for providing a second beam splitter having first and second sides, said first beam splitter being positioned in the path of said first in-block wave so as to direct said fourth wave to impinge on said first side of said second beam splitter, and a fourth surface for transmitting waves therethrough;

a second mechanically and thermally stable block for providing a medium for transmission of optical waves, said second block having, a first surface in the path of said second wave for producing a second in-block wave within said block, said second in-block wave being at least a portion of said second wave impinging on said second block first surface;

a second surface optically coated to provide a third beam splitter, said third beam splitter being in the path of said second in-block wave such that the angle of incidence thereon is less than 45 degrees, said third beam splitter splitting said second in-block wave into a fifth wave and a sixth wave, said fifth and sixth waves being a transmitted portion and a reflected portion, respectively, of said second in-block wave, a third surface having first and second sides for transmitting waves therethrough, said second block second surface being positioned in the path of said second in-block wave to direct said sixth wave to emerge from said second block third surface and impinge on said second side of said second beam splitter, and a fourth surface for transmitting waves therethrough; and said second surface of each of said first and second blocks being positioned relative to said first block third surface such that said second beam splitter is disposed in the path of said fourth and sixth waves such that said second beam splitter is capable of (i) transmitting a portion of said sixth wave impinging on said second side of said second beam splitter, reflecting a portion of said fourth wave impinging on said first side of said second beam splitter, and directing said transmitted portion of said sixth wave and said reflected portion of said fourth wave to emerge from said first block fourth surface toward a first spatial location, and (ii) transmitting a portion of said fourth wave impinging on said first side of said second beam splitter and reflecting a portion of said sixth wave impinging on said second side of said second beam splitter, and directing said transmitted portion of said fourth wave and said reflected portion of said sixth wave to emerge from said second block fourth surface toward a second spatial location.

2. The apparatus of claim 1 wherein said first, second, and third beam splitters are arranged so that said transmitted portions of said sixth wave through said second beam splitter coexists with said reflected portion of said fourth wave from said second beam splitter to form a first double beam signal, and said transmitted portion of said fourth wave through said second beam splitter coexists with said reflected portion of sixth wave from said second beam splitter to form a second double beam signal.

3. The apparatus of claim 1 wherein said partially transmissive wave reflecting means includes a substrate having a first surface being partially transmissive-reflective for providing a partially transmitting-reflecting mirror, and a second surface, opposite said first surface, being joined together to said first surfaces of said first and second blocks.

4. The apparatus of claim 3 wherein said third surface of each of said blocks are joined together.

5. The apparatus of claim 1 further including:

a first detector means responsive to said third wave for providing an output signal indicative of the intensity of one of said counterpropagating waves traveling about said closed-loop path;

a second detector means responsive to said fifth wave for providing an output signal indicative of the intensity of the other one of said counterpropagating waves traveling about said closed-loop path;

a third detector means at said first spatial location for providing an output signal indicative of the combined intensity of said transmitted portion of said sixth wave and said reflected portion of said fourth wave emerging from said second beam splitter; and a fourth detector means at said second spatial location for providing an output signal indicative of the combined intensity of said transmitted portion of said fourth wave and said reflected portion of said sixth wave emerging from said second beam splitter.

6. The apparatus of claim 5 further comprising means for providing an output signal indicative of the difference between said third and fourth detector means output signals.

7. The apparatus of claim 1 further including:

a first detector means at said first spatial location for providing an output signal indicative of the combined intensity of said transmitted portion of said sixth wave and said reflected portion of said fourth wave emerging from said second beam splitter; and a second detector means at said second spatial location for providing an output signal indicative of the combined intensity of said transmitted portion of said fourth wave and said reflected portion of said sixth wave emerging from said second beam splitter.

8. The apparatus of claim 7 further comprising means for providing an output signal indicative of the difference between said output signals of said first and second detector means.

9. The apparatus of claim 1 wherein said first and second beam splitters are oriented in a manner so that, (i) said transmitted portion of said sixth wave and said reflected portion of said fourth wave emerge from said first side of said second beam splitter at a slight angle with each other so as to create an interference fringe pattern at said first spatial location, and (ii) said transmitted portion of said fourth wave and said reflected portion of said sixth wave emerge from said second side of said second beam splitter at a slight angle with each other so as to create an interference fringe pattern at said second spatial location.

10. The apparatus of claim 2 wherein said second beam splitter includes a low absorption optical surface material so that said first and second double beam signals are substantially complementary in phase.

11. The apparatus of claim 2 wherein said second beam splitter includes a sufficiently high absorption optical surface material so that said first and second double beam signals have a phase difference which is substantially non-complementary.

12. The readout apparatus of claim 1 wherein said third surface of each of said first and second blocks are joined together and provide optical coupling.

13. The apparatus of claim 1 wherein said first, second, third, and fourth surfaces of each of said blocks for a polygon.

14. The apparatus of claim 1 wherein said first, second, third, and fourth surfaces of each of said blocks form a trapazoid.

15. A readout apparatus for a ring laser wherein a laser gain medium in combination with a plurality of wave reflecting means which are positioned to form an optical closed-loop path provides at least two counterpropagating waves traveling about said closed-loop path, the readout apparatus comprising:

one of said plurality of wave reflecting means being partially transmissive and capable of transmitting a first wave which is a portion of one of said counter-propagating waves impinging thereon, and a second wave which is a portion of the other one of said counter-propagating waves also impinging thereon;

a first mechanically and thermally stable block for providing a medium for transmission of optical waves said first block having, a first surface in the path of said first wave for producing a first in-block wave within said block, said first in-block wave being at least a portion of said first wave impinging on said first surface;

a second surface optically coated for producing a third wave being at least a reflected portion of said first in-block wave impinging thereon, said second surface being in the path of said first in-block wave such that the angle of incidence therein is less than 45 degrees, a third surface optically coated for providing a beam splitter having first and second sides, said third surface being positioned in the path of said third wave so that said third wave impinges on said first side of said beam splitter, and a fourth surface for transmitting waves therethrough;

a second mechanically and thermally stable block for providing a medium for transmission of optical waves, said second block having, a first surface in the path of said second wave for producing a second in-block wave within said block, said second in-block wave being at least a portion of said second wave impinging on said second block first surface;

a second surface optically coated for producing a fourth wave being at least a reflected portion of said second in-block wave impinging thereon, said second block second surface being in the path of said second in-block wave such that the angle of incidence thereon is less than 45 degrees, a third surface for transmitting waves therethrough, said second block third surface being positioned in the path of said fourth wave so that said fourth wave emerges from said second block third surface to impinge on said second side of said beam splitter, and a fourth surface for transmitting waves therethrough; and said second surface of each of said first and second blocks being positioned relative to said first block third surface such that said beam splitter is disposed in the path of said third and fourth waves such that said beam splitter is capable of (i) transmitting a portion of said fourth wave impinging on said second side of said beam splitter, reflecting a portion of said third wave impinging on said first side of said beam splitter, and directing said transmitted portion of said fourth wave and said reflected portion of said third wave to emerge from said first block fourth surface toward a first spatial location, and (ii) transmitting a portion of said third wave impinging on said first side of said beam splitter and reflecting a portion of said fourth wave impinging on said second side of said beam splitter, and directing said transmitting portion of said third wave and said reflected portion of said fourth wave to emerge from said second block fourth surface toward a second spatial location.

16. The apparatus of claim 15 further comprising:

a first detector means at said first spatial location for providing an output signal indicative of the combined intensity of said transmitted portion for said fourth wave and said reflected portion of said third wave emerging from said beam splitter;

a second detector means at said second spatial location for providing an output signal indicative of the combined intensity of said transmitted portion of said third wave and said reflected portion of said fourth wave emerging from said beam splitter; and means responsive to said first and second detector means for providing an output signal indicative of the difference between said output signals of said first and second detector means.

17. The readout apparatus of claim 15 wherein said third surface of each of said first and second blocks are joined together and provide optical coupling.

18. The apparatus of claim 15 wherein said first, second, third, and fourth surfaces of each of said blocks form a polygon.

19. The apparatus of claim 15 wherein said first, second, third, and fourth surfaces of each of said blocks form a trapazoid.

20. The apparatus of claim 15 wherein said beam splitter is arranged so that said transmitted portions of said fourth wave through said second beam splitter coexists with said reflected portion of said third wave from said beam splitter to form a first double beam signal, and said transmitted portion of said third wave through said beam splitter coexists with said reflected portion of said fourth wave from said beam splitter to form a second double beam signal.

21. The apparatus of claim 20 wherein said beam splitter includes a low absorption optical surface material so that said first and second double beam signals are substantially complementary in phase.

22. The apparatus of claim 20 wherein said beam splitter includes a sufficiently high absorption optical surface material so that said first and second double beam signals have a phase difference which is substantially non-complementary.

* * * * *

UNITED STATES PATENT AND TRADEMARK OFFICE

CERTIFICATE OF CORRECTION

PATENT NO. : 4,582,429

DATED : April 15, 1986

INVENTOR(S) : Stephen P. Callaghan

It is certified that error appears in the above-identified patent and that said Letters Patent is hereby corrected as shown below:

Column 8, line 7, cancel "for" and substitute --form--.

Column 8, line 38, cancel "therein" and substitute --thereon--.

Signed and Sealed this

*Twelfth* Day of *August 1986*

[SEAL]

*Attest:*

DONALD J. QUIGG

*Attesting Officer* *Commissioner of Patents and Trademarks*